July 10, 1956 ISAMU NOGUCHI 2,754,412
STRETCHER AND SUPPORT FOR JAPANESE LANTERNS
Filed April 13, 1953 2 Sheets-Sheet 1

INVENTOR.
ISAMU NOGUCHI
BY Percy Freeman

July 10, 1956 ISAMU NOGUCHI 2,754,412
STRETCHER AND SUPPORT FOR JAPANESE LANTERNS
Filed April 13, 1953 2 Sheets-Sheet 2
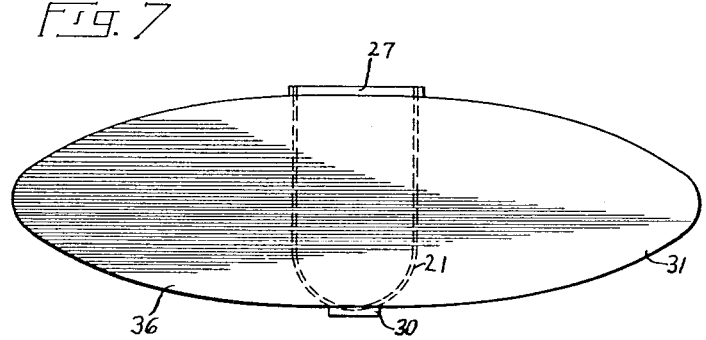
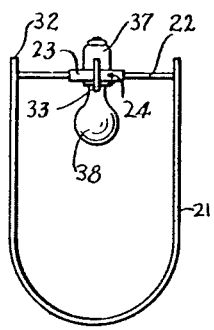 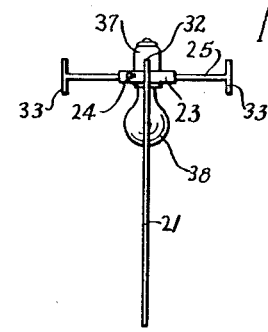 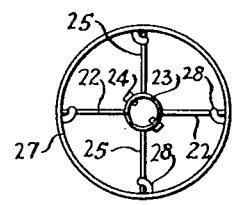
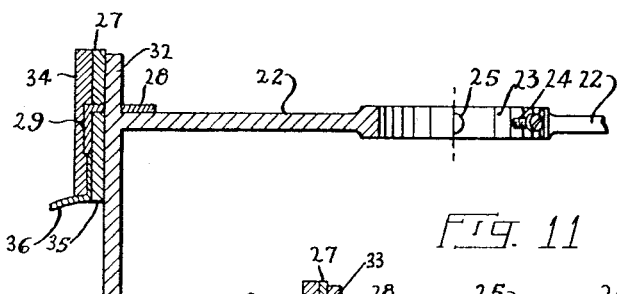
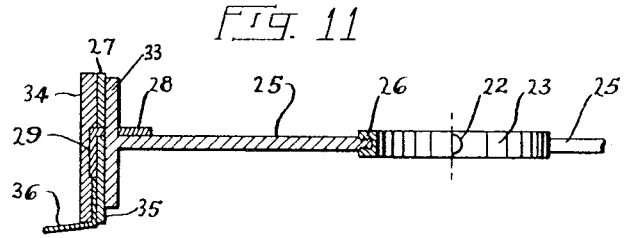
INVENTOR.
ISAMU NOGUCHI
BY
Percy Freeman

United States Patent Office 2,754,412
Patented July 10, 1956

2,754,412

STRETCHER AND SUPPORT FOR JAPANESE LANTERNS

Isamu Noguchi, New York, N. Y.

Application April 13, 1953, Serial No. 348,370

Claims priority, application Japan June 18, 1952

5 Claims. (Cl. 240—81)

This invention relates to a lamp construction.

This lamp construction pertains to floor lamps, table lamps, and ceiling lamps, as the drawings and specification indicate, but it may also relate to other forms of lamps such as wall lamps, bed lamps and the like.

The principal application of the present invention is to electric lamps of the type consisting of a frame, an electric light bulb and a collapsible lampshade, but it will be understood that it is equally applicable to lamps which burn liquid and gaseous fuel and the like.

The principal object of this invention is the provision of a lamp construction of the character described, wherein the frame consists of component parts which may very readily be assembled to form the frame, and disassembled to dismantle the frame, and wherein the lampshade is provided with unique fastening means to detachably mount it upon said frame.

In the illustrated forms of this invention, Japanese lanterns are used to illustrate all of the important constructional and functional features of the invention. More particularly, they show the construction of the frame, the lamp mounting on said frame, the construction of the collapsible lampshade and the means for securing the lampshade to the frame. It will be noted that the lampshade is not merely mounted on and secured to the lamp frame but it is also maintained on said frame in expanded or extended or spread condition. The means for securing the lampshade to the lamp frame and maintaining the lampshade in expanded or spread condition constitutes an important feature of this invention.

In one form of this invention, the lamp frame is mounted on legs which may be short when the lamp is to be used as a table lamp and which may be long when the lamp is to be used as a floor lamp. These legs are in screw-threaded engagement with the lamp frame and they may be screwed into or out of said frame.

In another form of this invention, there is no lamp stand or support of any kind and the frame may be suspended by simply hanging it from a suitable support, such as a ceiling fixture or the like. In the preferred form of this invention, the lampshade is extensible. One end is simply mounted upon one end of the lamp frame. The opposite end of the lampshade is pulled in the opposite direction until it is as taut and extended as desired, and said opposite end of the lampshade is thereupon hooked to the opposite end of the lamp frame. It is by this means that the lampshade is secured to the lamp frame and maintained in extended or expanded condition thereon. In another form of this invention, one end of the lampshade is caught under the lamp frame and the upper end of the lampshade is hooked to the upper end of the lamp frame.

An important feature of this invention is the fact that the entire unit, that is, the lamp frame, the lampshade and the lamp support or stand, if any, may be disassembled to very compact proportions for packaging, shipping and storing purposes. It may readily be assembled by the retail detailer or by the ultimate consumer, without special tools or equipment. The components of the structure herein claimed are light in weight and easily and inexpensively made.

Preferred forms of this invention are shown by way of illustration in the accompanying drawings, in which:

Fig. 7 is a side view of a Japanese lantern spread open and supported on a frame made in accordance with a second form of this invention.

Fig. 8 is a side view of the spreader framework of a lantern.

Fig. 9 is another side view of said framework, said view being 90° removed from the view of Fig. 8.

Fig. 10 is a top view of said lantern spreader framework.

Fig. 11 is an enlarged fragmentary section showing how the upper end of the lantern shade is secured to the upper end of the spreader framework.

Fig. 12 is a view similar to that of Fig. 11 but 90° removed therefrom.

Fig. 13 is an enlarged fragmentary section showing a modification of the locking means.

Figure 1:
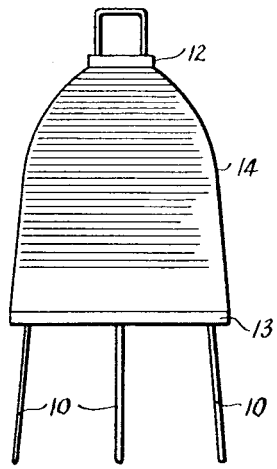
Fig. 1 is a side view of a Japanese lantern extended and supported by a framework made in accordance with one form of this invention.
Figure 2:
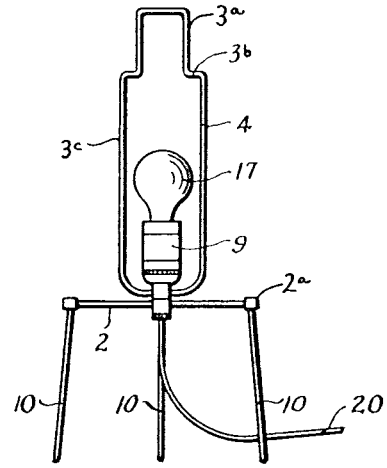
Fig. 2 is a similar view of the framework with the lantern removed therefrom.
Figure 3:
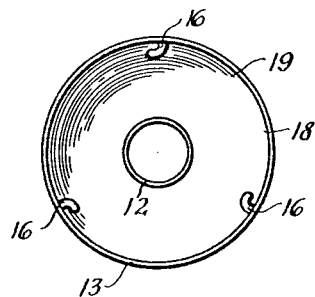
Fig. 3 is a view of the bottom end of the lattern, looking upwardly into said lantern.

Referring now to the first illustrated form of this invention and to Figs. 1 to 6 inclusive, it will be seen that the lamp frame which is made in accordance with the first form of this invention comprises a frame 4, a second frame 2 which is mounted on and includes legs 10, a Japanese lantern 14 which is attached at its upper end to frame 4 and at its lower end to frame 2, a threaded tubular member 8, a socket 9 including an internally threaded sleeve 9a which engages tubular member 8 to lock the two frames together and to hold the socket in place thereon, and an electric light bulb 17 mounted in said socket.

Figure 4:
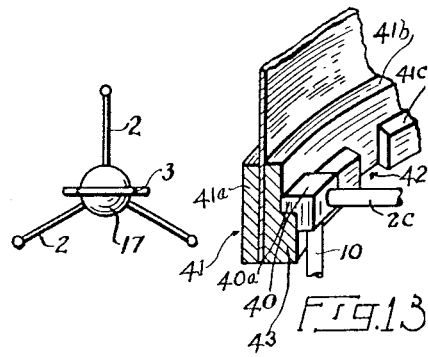
Fig. 4 is a top view of the framework of said Japanese lantern.

Frame 2 includes three horizontally extending arms which are secured at their inner ends to a ring 3, and it will be noted in Fig. 4 that these arms project radially outwardly from the axial center of the frame. Enlargements 2a are formed at the outer ends of the three arms and tapped holes 11 are formed in said enlargements. These tapped holes receive the screw-threaded upper ends of legs 10 in order to support the frame on said legs. It will be understood that legs 10 may be made short when the lamp is to be used as a table lamp, and they may be made long when the lamp is to be used as a floor lamp. These legs are positioned generally vertically but they tend to diverge slightly at their lower ends to provide a wider base for greater stability of the lamp.

Frame 4 is the lamp frame proper whereas frame 2 is the supporting frame for the lamp. Frame 4 comprises a single rod which is bent in the manner shown in Fig. 2. Its upper portion 3a has the shape of an inverted U and the legs of said inverted U are bent outwardly at their lower ends to form horizontal shoulders 3b. Below these shoulders is a relatively deep U-shaped portion 3c which includes a ring-shaped portion 5 at its lower center with a hole 6 formed therein.

Screw-threaded member 8 and threaded sleeve 9a are the means of holding the lamp frame 4 and the supporting frame 2 together. Threaded member 8 is provided with external screw threads 1 and with a vertically extending center hole 7 which extends its full length. It is through hole 7 that electric cord 20 projects, and it will be understood that said electric cord is connected in conventional manner to bulb socket 9 in order to supply bulb 17 with electric current from a suitable, conventional source (not shown). Threaded member 8 is provided at its lower end with a radially outwardly extending annular flange 8a. Resting on said flange 8a is ring 3 which encircles the threaded portion of threaded member 8. Resting on ring 3 is ring-shaped portion 5 of the upper frame 4 and said ring-shaped portion also encircles the threaded portion of threaded member 8. Threaded sleeve 9a may be fixed to socket 9 and it will be noted that said sleeve 9a serves as a nut with respect to the threaded portion of threaded member 8. This threaded sleeve or nut 9a, together with the lower end of socket 9 bears down upon ring-shaped portion 5 to lock said ring-shaped portion 5 against ring 3 and to lock both said rings and the socket together. It is by this means that the upper frame 4 and the lower frame 2 are securely held together.

Figure 5:
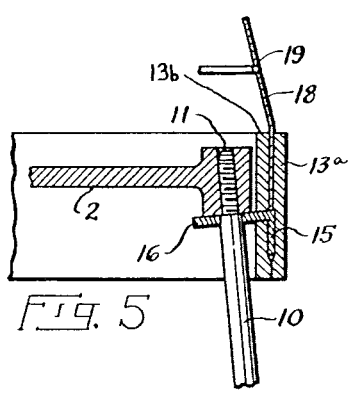
Fig. 5 is an enlarged fragmentary section showing how the supporting legs are secured to the framework and how the lower end of the shade is attached to said framework and said supporting legs.
Figure 6:
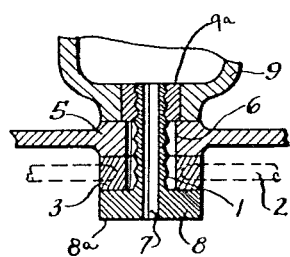
Fig. 6 is an enlarged fragmentary section showing how the upper part of the framework is secured to the lower part and how the lamp socket is secured to both parts of the framework.

Japanese lantern 14 is a stretchable or extensible shade which is provided at its upper end with a ring 12 of relatively small diameter and at its lower end with a ring 13 of relatively large diameter. Fig. 5 shows that ring 13 is, in reality, a double ring consisting of an outer ring portion 13a and an inner ring portion 13b, these two ring portions being concentric with each other and being adapted to engage and hold between them the lower end of the lantern material proper 18. Ring 12 may, if desired, also be made of two concentric rings which sandwich in between them the upper end of the shade material 18, but this construction is not an essential aspect of this invention. It will be noted that the lampshade may be reinforced with rings or strips of bamboo 19 to help maintain its shape.

When the shade is slipped over frame 4, inverted U-shaped portion 3a of said frame projects through ring 12 and may serve merely for decorative purposes or as a handle. The ring 12 rests on shoulders 3b and is supported by them. The shade is then extended or stretched downwardly until its lower ring 13 encircles enlargements 2a of the lower or supporting frame. It will be noted in Figs. 3 and 5 that hook-shaped members 16 are secured to ring 13 and project inwardly therefrom. More specifically, hook-shaped members 16 are provided with downwardly bent end portions 15 which are sandwiched in between ring portions 13a and 13b of ring 13. It is in this manner that hook members 16 are secured to ring 13.

Hook members 16 are hooked around the upper ends of legs 10 and they abut the lower ends of enlargements 2a. It is in this manner that the lower end of the shade is securely fastened to the supporting frame, and it is in this manner that said shade is maintained in expanded condition.

Turning now to the second form of this invention and to Figs. 7 to 12 inclusive, it will be seen that lantern 31 having a body 36 is secured to frame 21 in substantially the same manner and by substantially the same means as the shade first above described is secured to the frame first above described. The only important difference is the fact that in the first form of this invention, the lampshade frame was mounted on a supporting frame and the upper end of the shade is secured to the lamp frame and the lower end to the supporting frame whereas in the present form of the invention as shown in Figs. 7 to 12 inclusive, there is only a single lamp frame to which the upper and lower ends of the shade or lantern are both secured, said frame being suspended from a suitable elevated support such as the ceiling of a room.

Frame 21 is a U-shaped member which supports a horizontally extending crossbar 22. A small portion 32 of the upper ends of the arms of U-shaped member 21 projects upwardly above crossbar 22 at both ends thereof. A ring-shaped portion 23 is formed in the center of crossbar 22 to accommodate socket 37 supporting electric light bulb 38. One or more set screws 24 may be screwed into ring-shaped portion 23 to engage and hold said socket 37.

Projecting radially outwardly from ring-shaped portion 23 is a pair of arms 25, and it will be noted in Fig. 10 that the two portions of crossbar 22 on opposite sides of ring portion 23 are diametrically aligned with each other and the two arms 25 are also diametrically aligned with each other and said arms and said crossbar portions are all separated from each other by 90°. At the ends of arms 25 are vertically extending bars 33 which project both upwardly and downwardly from the ends of said arms 25.

On the lower end of shade 31 is a ring 30 of relatively small diameter and on the upper end is secured a ring 27 of relatively large diameter. The smaller ring 30 is brought into abutment with the lower end of U-shaped frame 21 and the lantern is extended or stretched, the upper ring 27 is hooked to the upper ends of said frame 21 as well as to arms 25 as will hereinafter more fully appear. Ring 27 is a double ring whose inner portion 35 and outer portion 34 engage the upper end of body 36 and the material of which the shade is made, between them.

Hook-shaped members 28 are secured to ring 27. These hook-shaped members extend radially inwardly from ring 27 and they are provided with downwardly extending end portions 29 which are sandwiched in between ring portions 34 and 35. It is in this manner that the hook-shaped members 28 are secured to ring 27. It will be noted that these hook-shaped members are hooked around end portions 32 of U-shaped frame 21 and they are also hooked around vertical bars 33 of arms 25. This is shown in Figs. 10, 11 and 12.

It has been stated that the illustrated forms of the invention are Japanese lanterns, and that the shades of said lanterns are not only mounted upon the frame but are also stretched thereon. The shade 31 is shown in Fig. 7 in its stretched or expanded condition. The lower end of frame 21 holds ring 30 in one position and it also holds ring 27 in another position, these two positions being spaced from each other a sufficient distance to subject the lampshade to stretching tension. The lower end of the frame prevents ring 30 from shifting upwardly and hooks 28 engaging the upper end of said frame and more particularly crossbar 22 and arms 25, prevent downward shifting of ring 27.

The manner in which crossbar 22 is secured to frame member 21 and to ring-shaped portion 23 and the manner in which arms 25 are secured to said ring-shaped portion 23 are matters that are not critical in relation to the present invention. Thus, crossbar 22 is shown to be integral with ring portion 23 and with frame member 21. It will be understood that the crossbar may be welded or otherwise secured to said ring portion 23 and said frame member 21 instead of being made integral therewith. Similarly, arms 25 are shown to be provided with screw-threaded end portions which engage threaded sockets 26 in ring-shaped member 23. This, too, is purely illustrative.

In the modification shown in Fig. 13, it will be seen that the ring at the lower end of the lantern shown in Figs. 1 and 5 may be made without the hook-shaped members 16. In this modification the ring 41 may comprise an outer ring 41a similar to outer ring 13a and inner ring 41b which is stepped or rabbeted to provide a shoulder 41c which will lock under extensions 40a on enlargements 40 on the ends of frame members 2c, there being passageways 42 extending through inner ring 43 to permit the passage therethrough of extensions 40a, the ring 41 then being rotated relative to the enlargements 40. The effect of a bayonet clutch is thus obtained. Obviously, the particular type of locking engagement between the lantern ring and the supporting frames may be varied in many ways.

The foregoing is illustrative of preferred forms of this invention. It will be understood that these preferred forms may be modified and other preferred forms may be provided within the broad spirit of the invention and the broad scope of the claims.

Having thus described my invention, what I claim as new and desire to secure by Letters Patent, is:

1. A lamp construction of the character described, comprising a stretcher frame, a bulb socket supported by said frame, and a normally axially collapsible lampshade mounted on said frame, one end of said shade being held against one end of said frame and the other end of said shade being interlocked with the other end of said frame when the shade is extended, whereby said shade is removably retained in said extended condition, that end of the shade which is interlocked with the stretcher frame comprising a ring which is provided with a plurality of inwardly projecting hooks, the frame being provided with hook-engaging portions which engage said hooks and detachably secure said end of the shade to the frame.

2. A lamp construction of the character described, comprising a stretcher frame, a bulb socket supported by said frame, and a normally axially collapsible lampshade mounted on said frame, one end of said shade being held against one end of said frame and the other end of said shade being interlocked with the other end of said frame when the shade is extended, whereby said shade is removably retained in said extended condition, said stretcher frame being U-shaped with a crossbar secured to its arms a short distance below the upper ends of said arms, one end of the shade being provided with a ring which is held against the yoke of said U-shaped frame, the opposite end of the shade being provided with a second ring and with means secured to said second ring which engage the upper ends of said arms immediately above and against the crossbar which is secured to said arms.

3. A lamp construction of the character described, comprising a stretcher frame, a bulb socket supported by said frame, and a normally axially collapsible lampshade mounted on said frame, one end of said shade being held against one end of said frame and the other end of said shade being interlocked with the other end of said frame when the shade is extended, whereby said shade is removably retained in extended condition, said stretcher frame comprising an upper framework and a lower supporting framework which carries said upper framework, the shade being held at its upper end against the upper end of the upper framework and being removably secured in stretched condition at its lower end to the upper end of the lower supporting framework.

4. A lamp construction of the character described, comprising a stretcher frame, a bulb socket supported by said frame, and a normally axially collapsible lampshade mounted on said frame, one end of said shade being held against one end of said frame and the other end of said shade being interlocked with the other end of said frame when the shade is extended, whereby said shade is removably retained in said extended condition, said stretcher frame comprising an upper framework and a lower framework which supports the upper framework, said lower framework including horizontally extending arms and vertically extending legs which support said arms, said upper framework having a reduced upper portion and horizontally extending shoulders below said reduced upper portion, said shade having a ring at its upper end which encircles the reduced upper portion of the upper framework and rests against the shoulders of said upper framework, the lower end of said shade being provided with a ring which encircles the horizontally extending arms of the lower framework, said lower ring being provided with inwardly extending hooks which engage the upper ends of the supporting legs of the lower framework and abut the horizontally extending arms which said supporting legs support.

5. A lamp construction of the character described, comprising a stretcher frame, a bulb socket supported by said frame, a normally axially collapsible lampshade mounted on said frame, one end of said shade being held against one end of said frame and the other end of said shade being interlocked with the other end of said frame when the shade is extended, whereby said shade is removably retained in said extended condition, that end of the shade which is hooked to the stretcher frame being provided with a double ring, the material of which the shade is made being sandwiched in between and held by said double ring, inwardly extending hooks being provided on said double ring, said hooks having vertically extending portions which are also sandwiched in between said double ring and are held in place therein, said hooks being in engagement wtih said frame to detachably secure the shade thereto.

References Cited in the file of this patent

UNITED STATES PATENTS

| | | |
|---|---|---|
| 261,037 | Plympton | July 11, 1882 |
| 370,770 | Drumheller | Oct. 4, 1887 |
| 1,184,097 | Hobson | May 23, 1916 |
| 1,745,976 | Brady | Feb. 4, 1930 |
| 2,411,189 | Brown | Nov. 19, 1946 |
| 2,606,280 | Stroschein | Aug. 5, 1952 |

FOREIGN PATENTS

| | | |
|---|---|---|
| 84,624 | Germany | Dec. 24, 1895 |
| 94,945 | Switzerland | June 1, 1922 |
| 656,959 | France | Jan. 7, 1929 |